United States Patent [19]

Tsinberg et al.

[11] Patent Number: 4,890,283
[45] Date of Patent: Dec. 26, 1989

[54] HIGH DEFINITION TELEVISION AUGMENTATION CHANNEL

[75] Inventors: Mikhail Tsinberg, Riverdale; Detlev Otto, Peekskill, both of N.Y.

[73] Assignee: North American Philips Corporation, New York, N.Y.

[21] Appl. No.: 123,031

[22] Filed: Nov. 19, 1987

[51] Int. Cl.$^4$ .......................... H04J 3/22; H04N 7/12; H04N 11/04
[52] U.S. Cl. ..................................... 370/84; 370/112; 370/118; 375/27; 375/47; 358/13; 358/133; 358/135
[58] Field of Search ................... 370/18, 69.1, 84, 118, 370/121, 122, 112; 375/1, 27, 38, 47; 358/12, 13, 133, 141, 142, 135

[56] References Cited
U.S. PATENT DOCUMENTS

| | | |
|---|---|---|
| 2,905,756 | 9/1959 | Graham . |
| 3,707,680 | 12/1972 | Gabbard et al. ..................... 370/118 |
| 4,613,903 | 9/1986 | Nadan ................................. 358/141 |

FOREIGN PATENT DOCUMENTS 3248687 7/1984 Fed. Rep. of Germany .
PCT/AU87/-
00020 1/1987 PCT Int'l Appl. .

Primary Examiner—Robert L. Griffin
Assistant Examiner—Wellington Chin
Attorney, Agent, or Firm—Algy Tamoshunas; Marianne R. Rich

[57] ABSTRACT

High transmission and reception quality is achieved in a high definition television system, with minimum intra-channel interference, by digitally encoding the enhancement information and employing spread-spectrum modulation techniques.

12 Claims, 6 Drawing Sheets

HIGH DEFINITION TELEVISION AUGMENTATION CHANNEL

BACKGROUND OF THE INVENTION

1. Field of the Invention

The invention pertains to television information transmission and reception and more particularly to the transmission and reception of high definition television information.

2. Description of the Prior Art

Conventional color television systems transmit picture information at a rate of 59.94 picture fields per second, two constituting a frame, each frame consisting of 525 horizontal scan lines. To reduce the transmission and reception bandwidths required to reproduce the transmitted picture, these horizontal scan lines are interlaced from field-to-field with a ratio of two-to-one, that is only every other scan line is transmitted in each field. Scan lines omitted in one field are transmitted in the next succeeding field, thus all the odd numbered fields contain one set of scan lines and the even numbered fields contain the set of scan lines which interlace with the scan lines in the odd numbered fields. This arrangement permits the transmission, reception, and picture reproduction at bandwidths reduced from that required for every scan line to be transmitted in each field.

Television pictures reproduced in these conventional systems have aspect ratio of four to three, i.e. for every four units of horizontal width there are three units of vertical height. Thus, a picture tube 15 inches on the diagonal has a width of 12 and a height of 9 inches, while a picture tube 19 inches on the diagonal has a width of 15.2 inches and a height of 11.4 inches.

The above specifications provide television pictures of good commercial quality which, however, degrade as the size of the picture tube increases. The graininess of the the picture produced by the 2:1 interlace ratio is acceptable for small screen receivers, but becomes more apparent as the the size of the picture tube increases. Consequently, as the television screens continue to increase in size the graininess becomes increasingly more unacceptable. To counteract this and provide greater picture resolution high definition television systems having increased aspect ratios and 1:1 progressive scans are presently under consideration.

SUMMARY OF THE INVENTION

In accordance with the principals of the present invention, digital data encoded from RGB high definition television signals are coupled to bit rate reducing circuitry wherein they are converted to digital signals at bit rates that are reduced from the bit rates of the input digital signals. The digital signals at the reduced bit rates are then coupled to a multiplexer which sequentially positions the input data and provides a multiplicity of digital data streams having equal bit rates. The equal bit rate data streams are then coupled to modulating circuitry, employing spread spectrum techniques, to modulate a carrier signal for transmission.

At a receiver the modulated carrier is demodulated and the equal bit rate data streams are reestablished. The equal bit rate data streams are then coupled to a demultiplexer where they are sequentially positioned and rearranged to provide the bit rate reduced data streams which are then coupled to a decoder, wherefrom digital data streams emerge that are representative of the digital data streams coupled to the input terminals of the transmitter.

DESCRIPTION OF THE PREFERRED EMBODIMENTS

Figure 1:
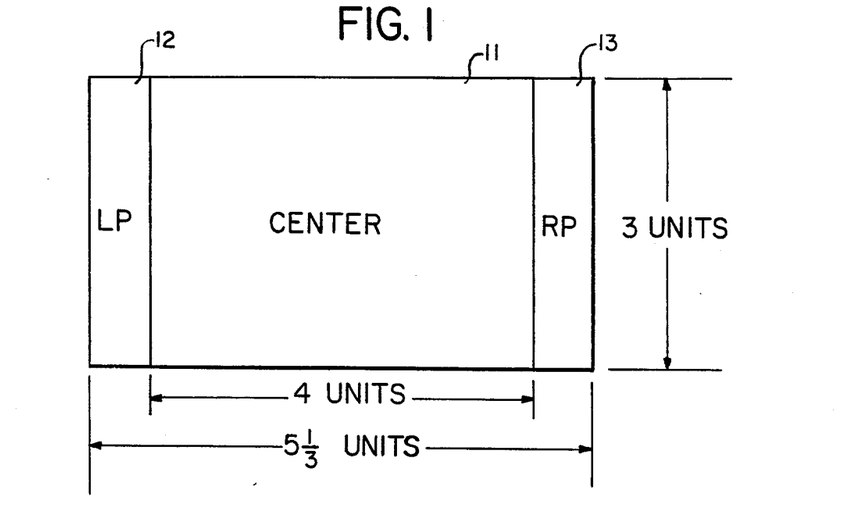
FIG. 1 is a representation of an augmented television picture screen showing thereon the left panel, the center panel, and the right panel.
Figure 2:
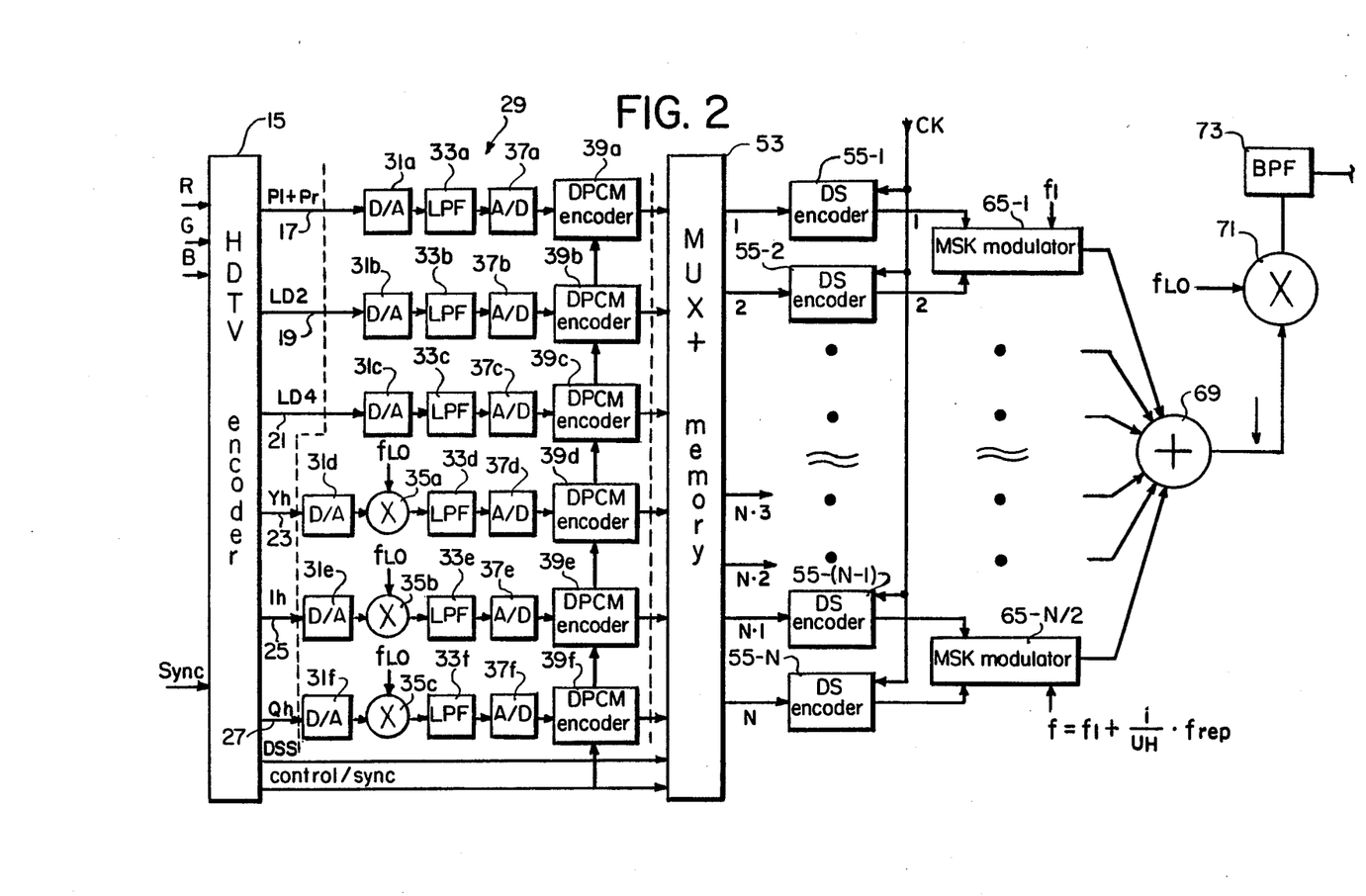
FIG. 2 is a block diagram of a transmitter of a preferred embodiment of the invention.
Figure 2A:
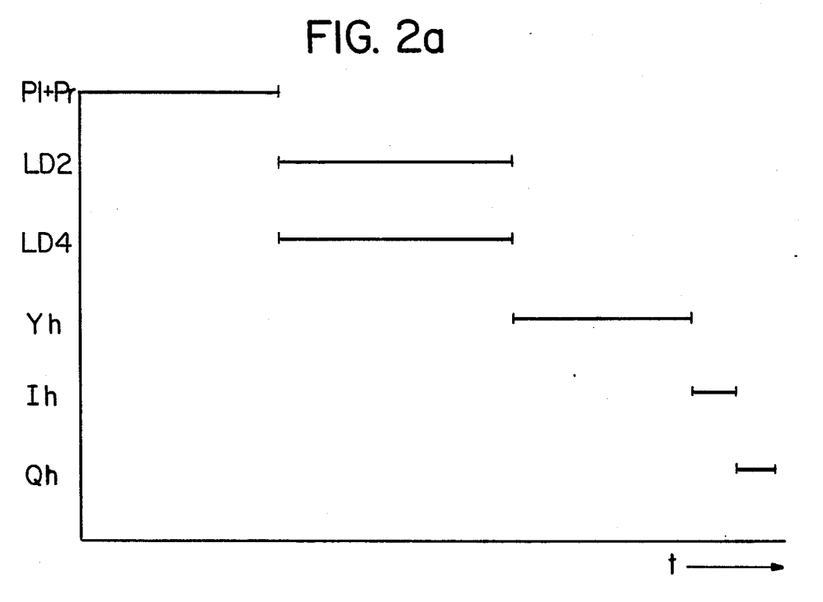
FIG. 2a is a diagram showing the allocation of time to encoded signals over a four scan line interval.

In a high definition television system there is a 1:1 sequential transmission of the scan lines in each frame and the frames are transmitted at a 59.94 Hz rate, in contrast to the 2:1 interlacing of fields which are transmitted at a 59.94 Hz rate on conventional television transmission. In addition, the aspect ratio of the picture is increased from 4:3 to 5.83:3 as shown in FIG. 1, wherein the center panel 11 is representative of the conventional TV picture, while the left panel 12 and right panel 13 are augmented to increase the aspect ratio as shown in the Figure. The total scan time for each scan line remains constant from frame-to-frame, as does scan time allotted to the center panel, and the total scan time allotted to the left and right panels. Though the total scan time allotted to the left and right panels remains constant from frame-to-frame the distribution of this allotted time may vary from frame-to-frame depending upon the position of the center panel. The high definition television (HDTV) source signals provide the RGB color components with a 525 line progressive scan, a frame rate of 59.94 Hz, 16:9 aspect ratio, and a 16.8 MHz horizontal bandwidth for luminance. As shown in FIG. 2, these source signals are coupled to a HDTV encoder 15, which may be the encoder disclosed by Cavallerano, et al in co-pending U.S. patent application Ser. No. 122,148, filed Nov. 17, 1987, entitled "High Definition NTSC Compatible Television System with Increased Horizontal Bandwidth and Reduced Color Artifacts", which is assigned to the Assignee of the present invention. This application is hereby incorporated by reference into the present application. This encoder processes the source signals and provides a sum of the left panel data and the right panel data on a line 17, two line differential (LD) encoding signals, which are derived from every four source lines, on lines 19 and 21, high frequency luminance (Yh) on line 23, and the chrominance signals (Ih, Qh) on lines 25 and 27, respectively. A time budget for these signals over a four line encoding interval may be as shown in FIG. 2a. As indicated in this figure the time intervals of the encoded signals, with the exception of the encoded LD2 and LD4 signals are mutually exclusive. These mutually exclusive time interval signals are coupled to the input terminals of the present invention for transmission.

Figure 2B:
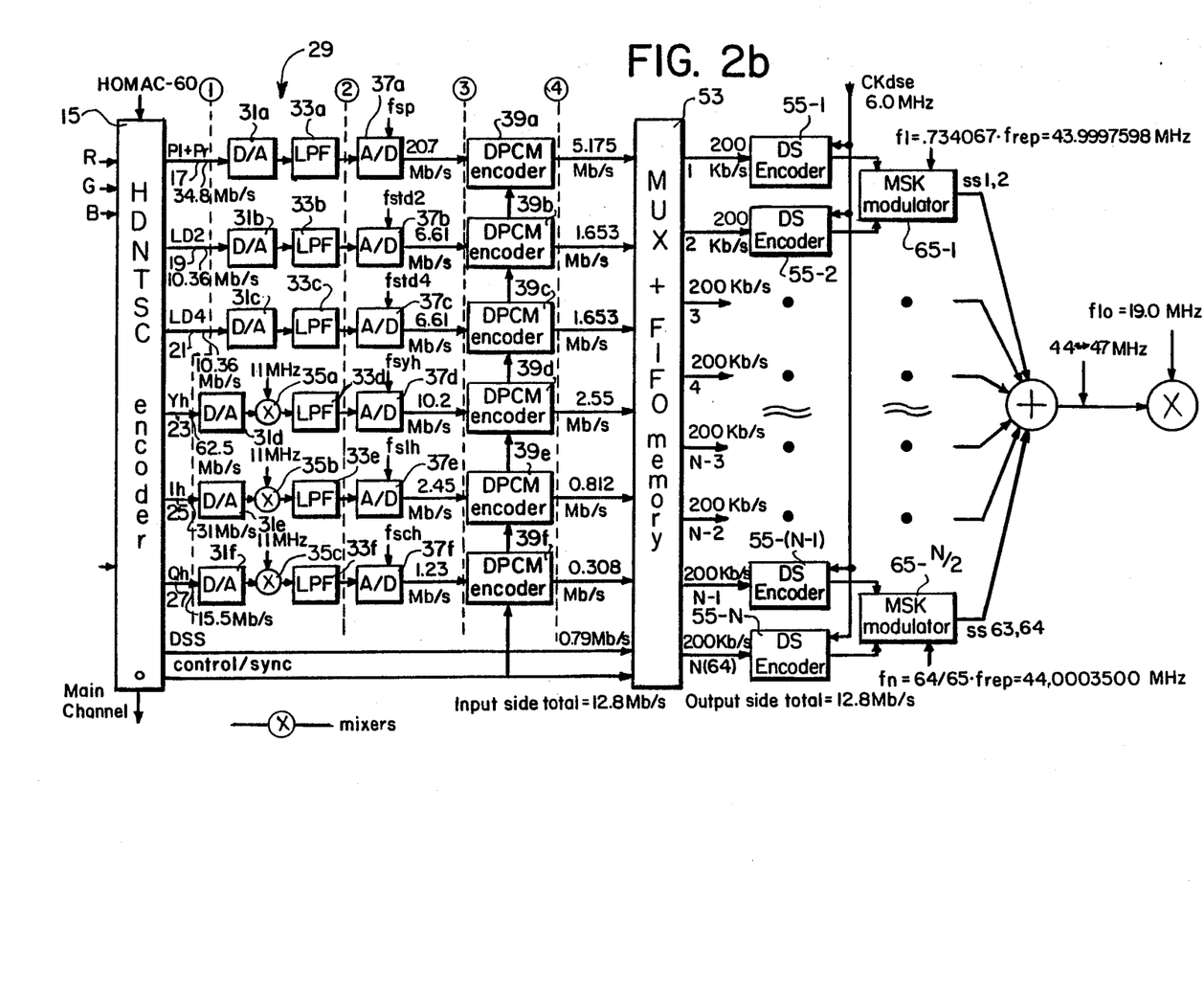
FIG. 2b is a block diagram of a transmitter of a preferred embodiment of the invention indicating thereon the bit rates and frequencies at the input and output terminals of each of the processing circuits.

Signals at the output terminals of the HDTV encoder are coupled to a bit rate reduction unit 29 in the transmitter wherein each stream of digital data is converted to an analog signal in digital to analog (D A) converters 31a through 31f. Analog signals established from the data streams on line 17, 19, and 21 are baseband signals which are coupled to low pass filters 33a–c, while luminance and chrominance analog signals derived from the data streams on lines 23, 25, and 27 have bandwidths about a center frequency. These signals are coupled to filters 33d–f as baseband signals after being down converted in mixers 35a–c. The low pass filters 33a–f remove extraneous frequencies and serve as anti-aliasing filters for the reconversion of the analog signals to digital signals by the analog to digital (A/D) converters 37a–f wherefrom digital signals emerge at bit rates reduced from that of the bit rates at the output terminals of the HDTV encoder 15. These bit rates, as well as reduced bit rates mentioned below can be found in FIG. 2b. Additional bit rate reduction is achieved by coupling the reduced bit rate data streams from the A/D converters to differential pulse code modulators 39a–f (DPCM) wherefrom a digital signal representative of the difference between the actual digital data sample and a predicted sample for that data is provided.

Figure 3A:
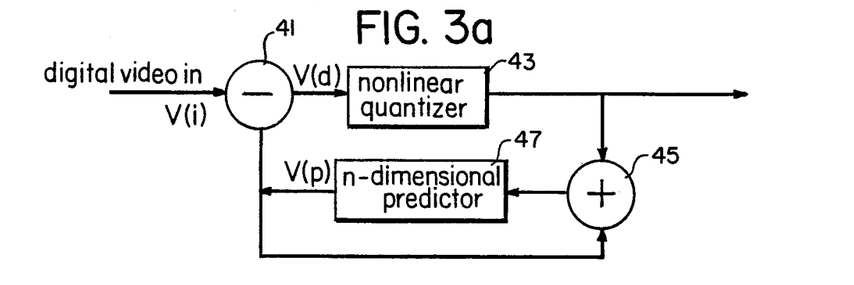
FIG. 3a is a diagram of a differential pulse code modulator encoder.

Each input value V(i) to the DPCM is compared with a predicted value V(p) which is based on the history of the input data. This history is accumulated over many cycles of the highly redundant video image and may be provided in three dimensions; two spatial and one temporal. For example, pixel values in the horizontal and vertical directions and corresponding values from consecutive frames are combined to yield the initial value V(p). DPCM systems and the generation of predictive values are taught in the article "DPCM Picture Coding With Adaptive Prediction" IEEE Transactions on Communications, No. 11, Nov. 1977, by Wilmut Zschunke, predictors being discussed on page 1295. This article is incorporated by reference into the present application. The difference V(d) between V(i) and V(p) is provided by a difference circuit 41 and coupled to a non-linear quantizer 43 shown in FIG. 3a. Non-linear quantizer 43 has a non-linear input/output characteristic and a limited number of output values. This non-linear characteristic is based on the human eye's greater sensitivity to luminance/chrominance errors in fields exhibiting small or no changes in luminance/chrominance, than it is to errors in fields exhibiting large luminance/chrominance changes. The number and size of the quantization steps are made functions of the value V(d), each increasing with the value of V(d). The output of the quantizer 43 is coupled to the output terminal of DPCM and to a sum circuit 45 wherein it is added to the previous predicted value from the n-dimensional predictor 47 and the sum, so produced, provided to the predictor 47 as a new prediction value.

Figure 3B:
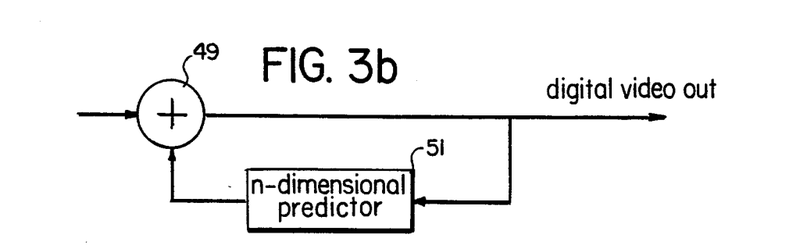
FIG. 3b is a block diagram of a differential pulse code modulator decoder.

FIG. 3b is a diagram of a circuit for recovering the actual digital sample value from the different value. DPCM data is coupled to a sum circuit 40 wherein it is added to the previously determined predicted value in an n-dimensional predictor 51. Sums resulting from this addition are coupled to the output terminal of the decoder and to the predictor 51 as an updated prediction.

Referring again to FIG. 2, six data streams with varying bit rates and mutually exclusive time intervals, with the exception of the data streams representative of the LD2 and the LD4 data from HDTV15, are coupled from the bit rate reducer 29 to a multiplexer/buffer memory 53. After a suitable delay of either the LD2 or LD4 data stream to provide a totality of mutually exclusive time intervals the data bit streams are sequentially stored in the memory of the multiplexer/buffer memory 53 wherein they are divided into N data streams of equal length that is the number of bits in each data stream are equal, and equal bit rate which are respectively and simultaneously coupled to N direct sequence encoders (DSE) 55-1 to 55-N.

Figure 4A:
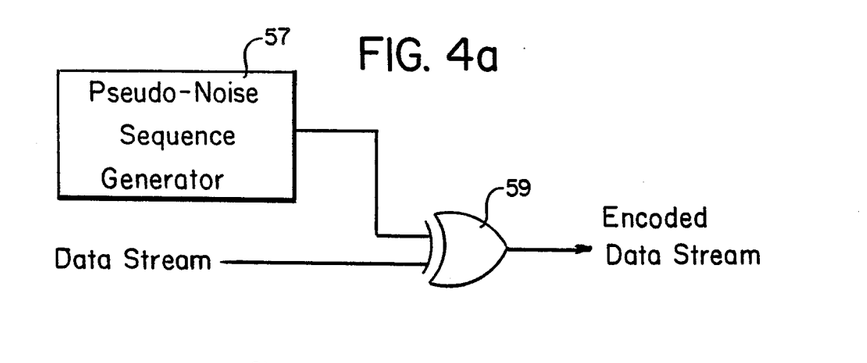
FIG. 4a is a diagram of a direct sequence encoder.

A modulo-2 addition is performed on the low bit-rate streams by the DSE to provide a code sequence at a predetermined increased bit rate for each of the data streams emanating from the multiplexer/buffer memory 53. A circuit for accomplishing this bit rate conversion is shown in FIG. 4a. A pseudo-noise sequence generator 57(PNSG) having a sequence rating at the desired conversion bit rate is coupled to one terminal of an exclusive OR gate 59, the other terminal of which is coupled to receive the data stream. Exclusive OR gate 59 provides an encoded data stream at a bit rate determined by the bit rate of the pseudo noise sequence generator 59. Only a small percentage of the possible codes that may be generated by the PNSG are utilized to achieve a code repetition rate equal to the TV frame repetition rate. Each code has a defined start point synchronized to the TV frame start. Of all the possible codes available from the PNSG 57 only N codes are chosen and their start points are defined such that each source bit to be transmitted is represented by a unique sequence within the repetition time of the code sequences. For a 200K bit/sec data rate, as in a preferred embodiment of the invention, a 6M bit/sec rate for the sequencing bits may, for example, be adopted thus establishing an appreciable overhead to allow for an optimum selection of sequences.

Figure 4B:
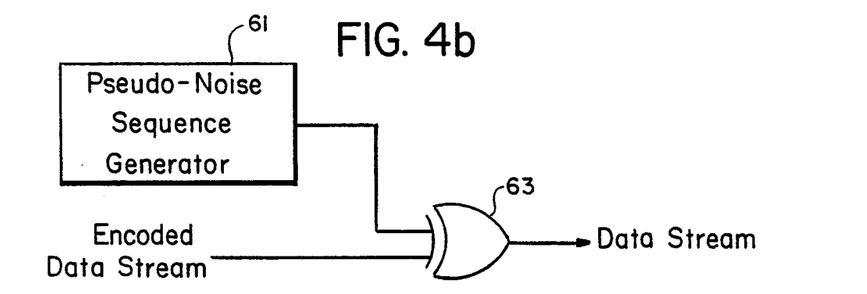
FIG. 4b is a diagram of a direct sequence decoder.

Extracting the initial data stream from the encoded data stream may be accomplished with the same DSE circuitry, as shown in FIG. 4b. In this figure a PNSG 61 is coupled to one input terminal of an exclusive OR gate 63, the other terminal of which is coupled to receive the encoded data stream. PNSG 61 is in synchronism with the encoded data stream thereby providing the original data stream at the output terminal of exclusive OR gate 63.

Figure 5A:
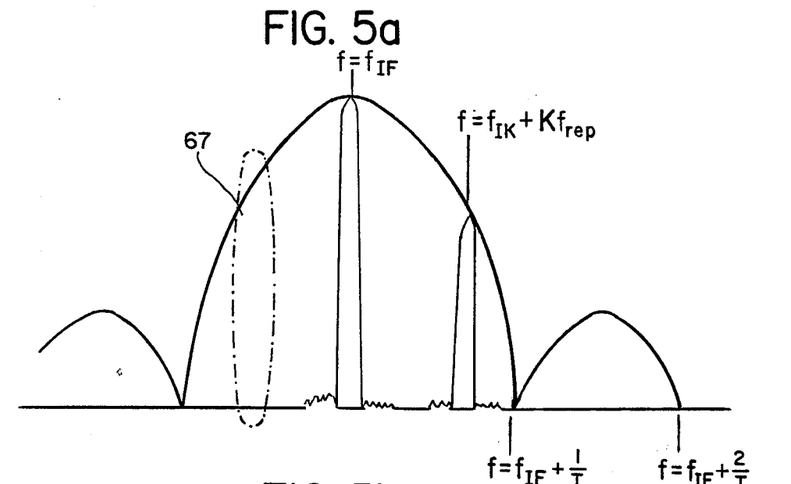
FIGS. 5a, 5b, and 5c are spectral representations of finite pulse sequences useful in explaining the invention.
Figure 5B:
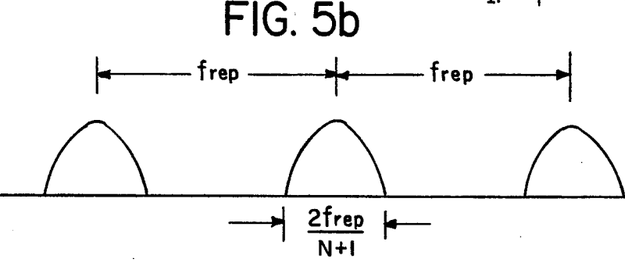

To provide minimum sidelobes for the transmitted signals the N coded data streams at the PNSG bit rate are combined in pairs and provided at an intermediate frequency (IF) spectrum by minimum shift key (MSK) modulators 65-1 through 65-N/2, as shown in FIG. 2. These MSK modulators provide a sequence of pulses at the intermediate frequency which constitute the coded signals. These signals are not infinite sequences, existing only for a small fraction of a frame time. Signals of this type exhibit spectral lobes within a $\sin(x)/x$ envelope determined by the width of the pulses in the sequence. Such a spectrum is represented in FIGS. 5a and 5b. If the width of the pulses within the sequence is equal to T the nulls of the $\sin(x)/x$ are at frequencies spaced from the center frequency equal to the reciprocal of the pulse width. Spectral lobes within the envelope have frequency spacing that are equal to the repetition rate of the pulses of the sequence, as shown in FIG. 5b, which is an expanded view of the area 67 in FIG. 5a. The width of these lobes is a function of the number of pulses in the sequence and the repetition rate and is equal to twice the repetition rate divided by the number of pulses plus one. Though not shown in the Figure each spectral lobe has a number of side lobes associated therewith.

Figure 5C:
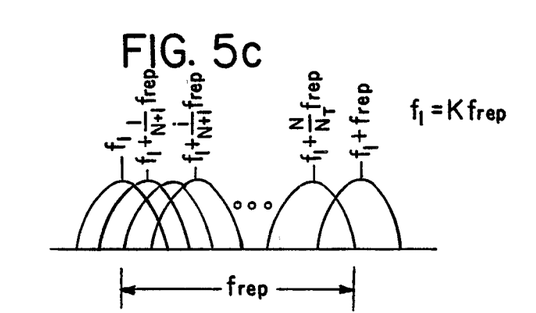

Each MSK modulator uses a different modulation carrier frequency. If the initial frequency is equal to K times the repetition frequency and each succeeding frequency is displaced from this initial frequency by [i/(N+1)]f (rep) it should be apparent that when i equals N the gap between two spectral lobes will be filled as illustrated in FIG. 5c. As shown in FIG. 2a summation network 69 is coupled to the output terminals of the MSK modulators to receive modulated signals and provide the summation thereof to a mixer 71 wherein they are converted and coupled via a bandpass filter 73 for transmission.

The combination of direct sequence encoding and minimum shift key modulation establishes a noise like spectral distribution for the radiated signal, spreading the signal energy over a relatively wide band of frequencies. This spread spectrum radiation has a very low power spectral density which would be deep in the noise of analog detectors operating in a finite band. Consequently these signals may radiate in the VHF and UHF taboo bands and not interfere with analog transmissions in these bands.

Figure 6:
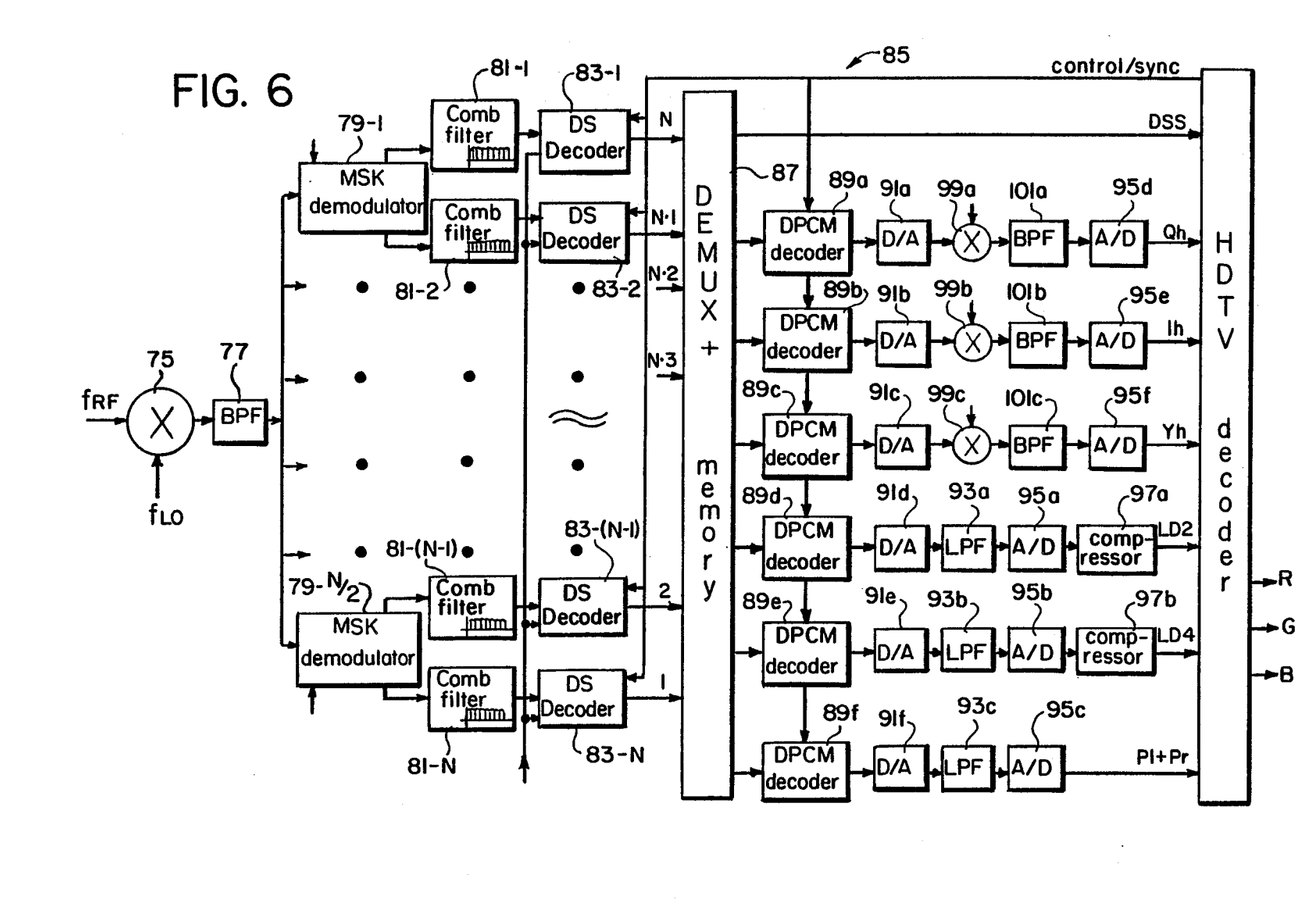
FIG. 6 is a block diagram of a receiver of a preferred embodiment of the invention.

Referring to FIG. 6 the transmitted signal is received and heterodyned in mixer 75 and passed through band pass filter 77 to a bank of MSK demodulators 79-1 through 79-N/2. Each of these demodulators operates at a demodulation carrier frequency corresponding to a modulation carrier frequency used in the transmitter. As a result, N nearly identical baseband spectrum are generated. Each baseband signal is coupled to an associated comb filter in a bank of comb filters 81-1 through 81-N to suppress unwanted and unnecessary spectral components and improve interchannel isolation. These filtered signals are then coupled to N direct sequence decoders 83-1 through 83-N to restore the original equal length equal bit rate data streams. Synchronization for this decoding is provided on line 85 from the main channel TV signal. Each equal length, equal bit rate data stream is coupled to a demultiplexer/buffer memory 87 wherein the demultiplexing operation reestablishes the original six DPCM encoded signals. Decoding of the DPCM encoded signals is accomplished in decoders 89a through 89f as previously described with reference to FIG. 3b. Reestablishment of the high definition TV coded signals continues with the digital to analog conversion of the decoded DPCM signals in the digital to analog converters 91a through 91f. The enhancement signals, in analog form, corresponding to LD2, LD4, and the left and right channel enhancement signals are coupled through low pass filters 93a–93c, converted to digital signals in analog to digital converters 95a–95c- whereat the left and right panel encoded signals have been reestablished. The LD2 and LD4 are further processed by time compressing these digital signals by 4:3 in compressors 97a–97b.

The analog luminance and chrominance signals are frequency shifted in mixes 99a–99b, bandpass filtered in filters 101a–101c, converted to digital signals in digital computers 95d–95f wherefrom the reestablished encoded luminance and chrominance signals are provided.

While the invention has been described in its preferred embodiments it is to be understood that the words which have been used are words of description rather than of limitation and the changes within the purview of the appended claims may be made without departure from the true scope and spirit of the invention in its broader aspects.

We claim:

1. An apparatus for transmitting a multiplicity of digital data streams comprising:

bit rate reducing means coupled to receive said multiplicity of digital data streams each having an associated bit rate for providing converted digital data streams at bit rates reduced from said associated bit rates;

means coupled to said bit rate reducing means for sequentially positioning said converted digital data streams to establish a sequence of digital data bits and for grouping said sequence of digital data bits to form a multiplicity of sequential digital data streams wherein all digital data streams have an equal number of data bits and equal bit rates, thereby providing a sequence of equal length and equal bit rate digital data streams; and means coupled to said sequentially positioning means for providing said sequence of digital data streams for transmission.

2. The apparatus of claim 1 wherein said bit rate reducing means includes:

first bit reduction means coupled to receive said multiplicity of digital data streams for providing a first bit rate reduction to said associated bit rates, thereby providing bit rate reduced digital data signals; and second bit reduction means coupled to said first bit rate reduction means for providing digital signals representative of differences between said bit rate reduced digital signals and corresponding predicted digital signals, thereby providing said converted digital data streams at bit rates reduced from said associated bit rates.

3. The transmitter of claim 2 wherein said first bit rate reduction means includes:

digital-to-analog converter means coupled to receive said plurality of digital data streams for converting said digital data streams to corresponding analog signals;

means coupled to said digital-to-analog converting means for shifting non-baseband analog signals to baseband analog signals;

filter means coupled to said shifting means for limiting bandwidths of baseband analog signals, thereby providing band limited analog signals; and analog-to-digital converter means coupled to said filter means for converting said band limited analog signals to digital signals at bit rates that are reduced from said predetermined bit rate.

4. The apparatus of claim 1 wherein said multiplicity of digital data streams are coded augmentation signals for high definition television systems.

5. An apparatus for receiving a transmitted carrier signal modulated by a multiplicity of sequential equal length and equal bit rate digital data streams, wherein all digital data streams have an equal number of digital data bits and equal bit rates, derived from differential digital data signals, the differential digital data signals being obtained from a plurality of digital data signals, each having an associated bit rate, comprising:

means for receiving and demodulating said carrier signal to provide said multiplicity of sequential equal length, equal bit rate digital data streams;

means coupled to said demodulating means to receive said multiplicity of sequential equal length, equal bit rate digital data streams for providing said differential digital data signals; and means coupled to said differential digital data signals means for processing said differential digital data signals to provide signals representative of said plurality of digital data signals.

6. A method for transmitting a multiplicity of digital data streams each having an associated bit rate comprising the steps of:

reducing each associated bit rate to provide a multiplicity of digital data streams at reduced bit rates;

positioning said multiplicity of digital data streams at reduced bit rates to establish a sequential arrangement of digital data bits;

grouping said sequential arrangement of digital data bits to form a sequence of digital data streams wherein all digital data streams in said sequence of digital data streams have an equal number of bits and equal bit rates, thereby providing a sequence of equal length and equal bit rate digital data streams; and providing said sequence of digital data streams for transmission.

7. The method of claim 6 wherein the step of reducing each associated bit rate includes the steps of:

processing said multiplicity of digital data streams to provide a multiplicity of digital data streams at bit rates reduced from said associated bit rates, thereby providing a multiplicity of digital data streams at reduced bit rates; and transforming said multiplicity of digital data streams at said reduced bit rates to digital data streams representative of differences between said digital data streams at said reduced bit rates and predicted digital data streams, thereby establishing said multiplicity of digital data streams at reduced bit rates.

8. The method of claim 7 wherein the step of reducing said associated bit rates to the reduced bit rates includes the steps of:

converting said multiplicity of digital data streams to analog signals to obtain a multiplicity of analog signals;

shifting non-baseband analog signals of said multiplicity of analog signals to baseband;

filtering baseband analog signals to provide band limited analog signals; and reconverting said filtered analog signals to digital signals.

9. A method for providing a plurality of digital data signals from a sequence of equal length, equal bit rate digital data streams, wherein all digital data streams have an equal number of digital data bits and equal bit rates, derived from differential digital data signals, the differential digital data signals being obtained from the plurality of digital data signals, each having an associated bit rate, comprising the steps of:

receiving said sequence of equal length, equal bit rate digital data streams;

reconstructing said differential digital data signals from said sequence of equal length, equal bit rate digital data streams;

providing predicted digital signals respectively corresponding to said differential digital data signals; and adding said predicted digital signals. corresponding differential digital data signals to 10. An apparatus for transmitting a multiplicity of digital data signals comprising:

bit rate reducing means coupled to receive said multiplicity of digital data signals, each having an associated bit rate, for providing converted digital data signals at bit rates reduced from said associated bit rates;

means coupled to said bit rate reducing means for sequentially positioning said converted digital data signals to establish a sequence of digital data bits and for grouping said sequence of digital data bits to form a multiplicity of digital data streams wherein all digital data streams have an equal number of data bits and equal bit rates;

a multiplicity of direct sequence encoders coupled to said sequentially positioning means to respectively receive said multiplicity of digital data streams;

a plurality of minimum shift key modulators each coupled to a pair of said direct sequence encoders; and summing means coupled to said plurality of minimum shift key modulators for providing a sum of signals emitted from said minimum shift key modulators for transmission.

11. An apparatus for receiving a transmitted carrier signal modulated by a sequence of digital data streams derived from differential digital data signals, wherein all digital data streams in the sequence have an equal number of digital data bits and equal bit rates, the differential digital data signals being obtained from a plurality of digital data signals, each of the digital data signals having an associated bit rate, comprising:

a plurality of minimum shift key demodulators coupled to receive said carrier signal, each minimum shift key demodulator providing a pair of demodulated signals;

a multiplicity of direct sequence decoders coupled respectively to receive said demodulated signals and provide said sequence of digital data streams;

means coupled to said multiplicity of direct sequence decoders to receive said sequence of digital data streams for providing said differential digital data signals; and means coupled to said differential digital data signals means for processing said differential digital data signals to provide signals representative of said plurality of digital data signals.

12. The receiver of claim 11 wherein said processing means includes:

prediction means for providing predicted digital signals; and means coupled to said prediction means and to said positioning means for respectively adding said differential digital signals to corresponding predicted digital signals.

* * * * *